United States Patent [19]
Tsuchida et al.

[11] Patent Number: 5,229,465
[45] Date of Patent: Jul. 20, 1993

[54] OXYGEN-PERMEABLE POLYMERIC MEMBRANES

[75] Inventors: Eishun Tsuchida; Hiroyuki Nishide, both of Tokyo; Hiroyoshi Kawakami, Hachioji, all of Japan

[73] Assignee: Praxair Technology, Inc., Danbury, Conn.

[21] Appl. No.: 722,890

[22] Filed: Jun. 28, 1991

[30] Foreign Application Priority Data

Jun. 30, 1990 [JP] Japan .................................. 2-173117

[51] Int. Cl.$^5$ ...................... C08F 14/18; C08F 18/20; B01D 71/06
[52] U.S. Cl. ..................................... 525/326.2; 55/16; 55/158; 525/328.2; 525/370; 525/375; 525/377; 526/217; 526/236; 526/262; 526/265; 526/245
[58] Field of Search ............ 526/245; 525/370, 326.2, 525/375; 55/16, 158; 204/129

[56] References Cited

U.S. PATENT DOCUMENTS

| | | | |
|---|---|---|---|
| 4,198,851 | 4/1980 | Janata | 204/153.16 |
| 4,564,561 | 1/1986 | Lore | 428/422 |
| 4,609,383 | 9/1986 | Bonaventura | 55/16 |
| 4,655,807 | 4/1987 | Ohmori | 55/522 |
| 4,833,207 | 5/1989 | Kinaga | 525/276 |
| 4,859,754 | 8/1989 | Maekawa | 526/245 |

OTHER PUBLICATIONS

"Composite Polymeric Membrane Containing Oxygen Carrier", Masanori Ikeda and Hirokazu Ohno, Proceedings, vol. 1, The 1990 International Congress on Membranes and Membrane Processes, ICOM '90, Chicago, U.S.A., 1990, pp. 667-669.

*Primary Examiner*—Joseph L. Schofer
*Assistant Examiner*—Fred Zitomer
*Attorney, Agent, or Firm*—Alvin H. Fritschler

[57] ABSTRACT

Oxygen-permeable polymeric membranes, intended for use in processes for producing oxygen- or nitrogen-enriched air for industrial, medical, and other applications, are characterized by a complex which comprises (a) a copolymer of a vinyl aromatic amine and either (i) a fluoroalkyl acrylate or (ii) a fluoroalkyl methacrylate, and (b) a ligand taken from the group consisting of (1) porphyrins, (2) Schiff bases, (3) cyclidenes, and (4) amine-like macrocycles, and (c) a transition metal (II) ion.

8 Claims, No Drawings

OXYGEN-PERMEABLE POLYMERIC MEMBRANES

BACKGROUND OF THE INVENTION

This invention relates to oxygen-permeable polymeric membranes to be used in processes for producing oxygen- or nitrogen-enriched air for industrial, medical, and other applications. More particularly, the invention concerns polymeric membranes which contain, as dispersed therein, a metal complex capable of adsorbing and desorbing oxygen rapidly and reversibly.

Oxygen is one of the chemicals most widely used on industrial scales, specifically in the manufacture of iron, steel, and other metals and glass, in chemical oxidation and combustion, and in wastewater disposal. It has also very extensive usage in the field of medical care, including the therapy for lung disease patients by means of oxygen inhalation. Nitrogen, on the other hand, is a chemical conveniently and extensively used to maintain a nitrogen atmosphere, for example, for the preservation of foods, in fermentation processes, and in electronic circuit fabrication. For these reasons the development of processes for concentrating oxygen and nitrogen out of air is an important problem with far-reaching effects on various sectors of industry. While low-temperature separation and adsorption are in use as industrial processes for the concentration of oxygen and nitrogen from air, membrane separation is considered promising from the energy-saving viewpoint.

Success of membrane separation depends primarily on the discovery of a membrane material that would permit selective and efficient oxygen permeation relative to nitrogen from air. Currently available membranes capable of permeating and concentrating atmospheric oxygen (known as oxygen-permeable membranes) are those of silicone, silicone polycarbonate, and the like. Some of them are in practical service. They do not have high oxygen-permeation selectivity ($O_2/N_2$) value (oxygen-permeability coefficient/nitrogen-permeability coefficient), the value being approximately 2, and yet exhibit high permeability coefficient ($10^{-8}$ [$cm^3 \cdot (STP) \cdot cm/cm^2 / \cdot sec \cdot cmHg$]). With this feature the membranes are incorporated in modules, multi-stage processes, and other systems to obtain oxygen-enriched air, with oxygen concentrations of approximately 30%. In order to obtain highly oxygen-rich air useful for industrial and medical applications by a single, continuous permeable-membrane pass, it is essential that the separating membrane have an ($O_2/N_2$) value of at least 5.

The first requisite for an enhanced selectivity ($O_2/N_2$) is to make oxygen more soluble than nitrogen with respect to the membrane.

We have hitherto continued the synthesis of metal complexes capable of rapid, reversible adsorption and desorption of oxygen molecules. As a result, we clarified essential requirements of the metal complexes that can adsorb and desorb oxygen molecules selectively, rapidly, and reversibly, even in a solid-phase membrane polymer. We successfully synthesized the novel complexes and taught their use for oxygen-enriching membranes (Japanese Patent Application Public Disclosure No. 171730/-1987).

Highly oxygen-rich air is useful for industrial and medical applications, and large quantities of highly nitrogen-rich air are used as inert gas in many sectors of industry. If they are to be obtained continuously by a single economical pass, it is essential that the separating membrane have a selectivity ($O_2/N_2$) value of at least 5 and a membrane life long enough to maintain the performance stably for months.

We have hitherto carried on the synthesis of metal complexes capable of rapid, reversible adsorption and desorption of oxygen molecules. As a result, we successfully synthesized novel metal complexes that can adsorb and desorb oxygen molecules selectively, rapidly, and reversibly, even in a solid phase. We further found that the metal complexes carried in high-molecular-weight solid-phase membranes are kept from irreversible oxidation and permit stable, selective permeation of oxygen.

However, polymeric membranes incorporating such complexes, when used in air permeation, did not always achieve the object satisfactorily. Although the ($O_2/N_2$) value exceeded the target value of 5, the permeability dropped to 50% in no more than 20 days of continuous permeation.

SUMMARY OF THE INVENTION

In view of the above, we have made further intensive research. We have now successfully produced reddish brown, stable membranes by dispersing such a metal complex uniformly in a fluorine-containing polymeric material under certain conditions.

The present invention thus resides in oxygen-permeable polymeric membranes as follows:

1. An oxygen-permeable polymeric membrane characterized by a complex comprising (a) a copolymer of a vinyl aromatic amine and either (i) a fluoroalkyl acrylate or (ii) a fluoroalkyl methacrylate, and (b) a ligand taken from the group consisting of (1) porphyrins, (2) Schiff bases, (3) cyclidenes, and (4) amine-like macrocycles, and (c) a transition metal (II) ion.

2. The membrane of 1 above in which the alkyl group in the fluoroalkyl acrylate or fluoroalkyl methacrylate contains from 2 to 11 carbon atoms and at least 3 fluorine atoms.

3. The membrane of 1 above in which said ligand is a porphyrin.

4. The membrane of 3 above in which said porphyrin is meso-tetrakis($\alpha,\alpha,\alpha,\alpha$-o-pivalamidophenyl)porphyrinato.

5. The membrane of 1 above in which said transition metal (II) comprises cobalt (II).

6. The membrane of 1 above in which said vinyl aromatic amine comprises vinyl imidazole or vinyl pyridine.

7. The membrane of 1 above in which said transition metal (II) comprises from about 0.01 to 1.7 millimoles per gram of said complex.

8. The membrane of 1 above in which (a) said copolymer comprises (i) either vinyl imidazole or vinyl pyridine and (ii) either a fluoroalkyl acrylate or a fluoroalkyl methacrylate in which the alkyl group in the fluoroalkyl acrylate or fluoroalkyl methacrylate contains from 2 to 11 carbon atoms and at least 3 fluorine atoms, and (b) said ligand is meso-tetrakis($\alpha,\alpha,\alpha,\alpha$-o-pivalamidophenyl)porphyrinato, and (c) said tarnsition metal (II) ion is cobalt (II).

9. The membrane of 8 above in which said cobalt (II) comprises from 0.01 to 0.20 millimoles per gram of said complex.

DETAILED DESCRIPTION OF THE INVENTION

These membranes have been found to possess selectivity ($O_2/N_2$) values of more than 10 and the capability of collecting oxygen-rich air, with atmospheric oxygen concentration of 70% or more, by single-step permeation. Metal complexes capable of reversible oxygen adsorption and desorption usually are complexes consisting of a metal ion of a low oxidation number and a ligand of conjugated system combined with an aromatic amine. The present invention preferably utilizes a complex consisting of a meso-tetrakis(α,α,α,α-o-pivalamidophenyl)porphyrinato transition metal (II) as the first component and a copolymer of a fluoroalkyl acrylate or fluoroalkyl methacrylate and a vinyl aromatic amine as the second component.

As the ligand that constitutes the metal complex, any of those mentioned above may be used instead.

Among other examples of porphyrins is "PRIXDME", protoporphyrin IX dimethyl ester.

Examples of Schiff bases include "salen", bis(-salicylideneiminato) ethylenediamine, and "3-methoxysaltmen", N,N'-bis(3-methoxysalicylideneiminato)tetramethylethylenediamine.

Cyclidenes are, for example, "lacunar methyl, methyl-$C_6$-cyclidene", 2, 3,10, 11, 13, 19-hexamethyl-3, 10, 14, 18, 21, 25-hexaazabicyclo[10.7.7]hexacosa-1,11,13,18,25-hexene$_k{}^4$N, and "lacunar phenyl,benzyl-metaxylyl-cyclidene", 3,11-dibenzyl-2,12-diphenyl-3,11,15,19,22,26-hexaazatricyclo[11.7.7.1$^{5,9}$]octacosa-1,5,7,9(28),12,14,19,21,26-nonaene$_k{}^4$.

Examples of amine-like macrocycles are "lacunar Me$_2$(p-xylylene)Me$_2$malMeDPT", 7,19-Diacetyl-6,20-diketo-8,13,18-trimethyl-26,33-dioxa-9,13,17-triazatricyclo[23.8.2$^{28,31}$.1$^{1,5}$.-1$^{21,25}$]heptatriaconta-1,3,5(36),7,18,21,23,25(37),28,30,34-undecaenato-$k^3$N-$k$20, and "salMeDPT", bis-(salicylideneiminato)-N-methyl-dipropylenetriamine.

The transition metal (II) ion, especially cobalt (II), forms a complex which has reversible interactions with $O_2$.

The aromatic amine functions as the axial base in the complex, "activating" the complex for reversible interactions with $O_2$. The amine residues, such as derivatives of pyridine or imidazole, may be present in either high-molecular-weight polymers as pendant groups.

If an oxygen complex with long-period stability is to be formed, it is essential to control the deterioration of the complex. Complex deterioration, largely due to irreversible oxidation, proceeds as follows:

$$CoP(II)-O_2 + H_2O \rightarrow CoP(III)-OH + HO_2$$

Moisture permeation through a polymeric membrane is governed by the water-molecule diffusibility, moisture absorption characteristics, and surface water repellency of the membrane. Therefore, the water permeation through a polymeric membrane can be controlled and an improvement in complex stability expected by having the complex supported by a polymeric material low in surface free energy and high in glass transition point, a physical constant of the polymeric material. The fluoro-group-containing acrylate and methacrylate type polymeric ligands used in the present invention show great surface water repellency. This combines with the dense, rigid, polymeric environments attributable to the bulky structure of fluorine molecules to enhance the stability of the complex.

Thus, the invention has now been perfected on the basis of the above findings. It provides novel oxygen-enriching polymeric membranes characterized in that a specific transition metal complex is uniformly dispersed in a fluorine-containing polymeric material. Experiments showed that the oxygen-enriching membranes of the invention (1) attained selectivity ($O_2/N_2$) values as such in excess of 5 and (2) had a membrane life ($\tau$), or the period for which the complex maintained its oxygen-combining capacity down to 50%, of more than three months. The membranes proved excellent in (3) durability too.

For use in the present invention it is desired that the metal complex of a porphyrin compound consist of a meso-tetrakis(α,α,α,α-o-pivalamidophenyl)porphyrinato transition metal (II) and, as a ligand, a copolymer (with a molecular weight of 100,000 to 300,000) of a vinyl aromatic amine and a fluoroalkyl acrylate or fluoroalkyl methacrylate in which the alkyl group contains from 2 to 11 carbon atoms and at least 3 fluorine atoms, typified by poly(hexafluorobutyl acrylate-N-vinylimidazole). If the alkyl group contains only 1 carbon atom, the resulting membrane will be hard and brittle, not necessarily suitable for gas permeation. The same applies to an alkyl group containing 12 or more carbon atoms. If the number of fluorine atoms is fewer than 3, the membrane will have an inadequate water-repellent effect. The metal ion and the ligand residue that constitute a complex are in a molar ratio appropriately in the range from 1:1 to 1:20.

A porphyrinato metal and a ligand are separately dissolved uniformly in an organic solvent such as acetone, thoroughly deoxidized, and mixed up. This mixed solution is cast over a Teflon sheet or the like in an oxygen-free atmosphere and the solvent is allowed to evaporate slowly. The procedure, known as solvent casting, yields a polymeric membrane. In this case the porphyrinato metal content is desirably chosen from the range of about 1 to about 20% by weight. If the content is less than 1% the oxygen-selective effect will be limited but a content of 21% or more embrittles the resulting membrane. For the manufacture of the membrane, thorough oxygen removal from the solution in advance is advisable.

The meso-tetrakis(α,α,α,α-o-pivalamidophenyl)porphyrinato transition metal (II) to be used may be porphyrinato cobalt, iron, or manganese, cobalt being most preferred.

The thickness of the oxygen-permeable membrane according to the invention is not specially limited but is usually chosen from the range of about 1 to about 100 μm. The membrane of the invention permits oxygen permeation with a high selectivity, at the ($O_2/N_2$) value of 5 or upwards. For example, air at an oxygen concentration of 70% or more can be obtained by single-stage concentration. The measurements of gas permeation through the oxygen-permeable membranes may be made using an ordinary gas permeability measuring instrument conforming to either the low vacuum method or the isotactic method.

EXAMPLES

The invention will be more fully described below in connection with examples thereof which, of course, are in no way limitative.

Also it is to be understood that although specifically dense membranes are dealt with in the examples, the membranes of the invention are applicable as well to porous membranes without departing from the spirit and scope of the invention.

Example 1

Nitrogen gas was introduced for 0.5 hour into 20 ml of an acetone solution containing 20 mg meso-tetrakis-($\alpha,\alpha,\alpha\alpha$-o-pivalamidophenyl)porphyrinato cobalt (II) (hereinafter called "CoP" for brevity) and also into 180 ml of an acetone solution containing 1 g poly(tetrafluoropropyl methacrylate-co-N-vinylimidazole) (TFMlm). Using three-way tubes the two solutions were simultaneously deaerated under vacuum.

Following thorough deaeration, the solutions were mixed, and the solvent was subjected to pressure reduction under vacuum until the total amount of the mixed solution decreased to about 70 ml. Next, the solution under vacuum was transferred into a dry box, the box was swept out several times with nitrogen, and the solution under vacuum was cast over a tetrafluoroethylene sheet 16 cm by 16 cm in size in an open nitrogen atmosphere. The acetone solution was gradually reduced in pressure inside the dry box, down to 60, 50, 30, and 10 cmhg over 24 hours. Finally, a polymeric membrane containing 2% by weight CoP, 50 to 60 μm thick, red and clear, with adequate mechanical strength, was obtained.

Reversible oxygen adsorption and desorption of the porphyrinato complex in the membrane could be confirmed from changes in the visible spectrum (oxygen-combined type: 545 nm; deoxygenation type: 528 nm).

The polymeric membrane thus prepared was tested for air permeability at a feed pressure of 10 mmhg in conformity with the low vacuum method. The permeability coefficient was $5.5 \times 10^{-10}$ cm$^3 \cdot$(STP)$\cdot$cm/cm$^2 \cdot$sec$\cdot$cmHg, and O$_2$/N$_2$=12, achieving efficient permeation of oxygen.

Also, the life of the complex in the membrane was measured by both pressure swing and visible spectrum techniques. Under the pressure swing, oxygen adsorption-desorption was performed by repeating a pressure change (760–76 mmHg) for a complex membrane (10 μm thick) set in a cell. The feed air was adjusted to a humidity of 10–95% and the measuring temperature to 10°–40° C. After the swing, the oxygen-combining ability was calculated from the visible spectrum. The results were compared with those of a membrane that used a fluorine-free ligand poly(octyl methacrylate-co-N-vinylimidazole) (OMAlm). The membrane life ($\tau$) at a humidity of 10% was 102 days for the TFMlm membrane and 25 days for the OMAlm one. The discrepancy between the membrane life ($\tau$) values widened as the humidity of the feed air increased. At a humidity of 95% the ($\tau$) value of the OMAlm membrane declined to 13 days whereas that of the TFMlm membrane was 75 days. Similar results were obtained with oxygen permeability which also was dependent upon the feed air humidity. It was confirmed experimentally that the complex membranes consisting of a porphyrinato complex uniformly dispersed in a fluorine-containing polymeric base can maintain their oxygen-combining capability stably for several months.

Example 2

A polymeric membrane having a thickness of 50 to 60 μm and containing 2% by weight of CoP was formed in the same manner as described in Example 1 with the exception that the ligand was replaced by poly(hexafluorobutyl methacrylate-co-N-vinylimidazole) (HFMlm). The membrane was tested for its permeability by the same method as used in the preceding example. The permeability coefficient was $6.8 \times 10^{-10}$cm$^3 \cdot$(STP)$\cdot$cm/cm$^2 \cdot$sec$\cdot$cmHg and $\alpha=10$, and efficient oxygen production was realized. The membrane life ($\tau\tau$) was evaluated in the same way as in Example 1. The life ($\tau$) of the HFMlm complex membrane determined with a visible spectrum and oxygen permeability measurements was three months, signifying membrane performance good enough for continuous permeation.

Example 3

The procedure of Example 1 was repeated except for the use of poly(octafluoropentyl acrylate-co-N-vinylmethylimidazole) (OFAlm) as the ligand. The resulting membrane containing about 20% by weight of CoP was subjected to permeability measurements in the same way as in Example 1. With a permeability coefficient of $8.6 \times 10^{-10}$ cm$^3 \cdot$(STP)$\cdot$cm/cm$^2 \cdot$sec$\cdot$cmHg and $\alpha=7$, the membrane produced oxygen efficiently. In the same manner as in Example 1 the membrane life ($\tau$) was evaluated. Visible spectrum and oxygen permeability measurements showed that the OFAlm complex membrane had a life ($\tau$) of four months, or sufficient membrane performance to withstand continuous permeation.

Example 4

Excepting the use of poly(octafluoropentyl acrylate-co-N-4-vinylpyridine) (OFAPy) as the ligand, the procedure of Example 1 was followed to obtain a membrane containing about 50% by weight of CoP. Permeability tests conducted similarly to Example 1 indicated that the membrane was capable of efficient oxygen production, with a permeability coefficient of $5.0 \times 10^{-10}$cm$^3 \cdot$(STP)$\cdot$cm/cm$^2 \cdot$sec$\cdot$cmHg and $\alpha=9$. The membrane life ($\tau$) was evaluated by the method of Example 1. The life ($\tau$) of the OFAPy complex membrane determined by visible spectrum and oxygen permeability measurements was four months, indicating that the membrane had sufficient performance for continuous permeation.

What is claimed is:

1. An oxygen-permeable polymeric membrane characterized by a complex comprising (a) a copolymer of a vinyl aromatic amine and either (i) a fluoroalkyl acrylate or (ii) a fluoroalkyl methacrylate, in which the alkyl group in the fluoroalkyl acrylate or fluoroalkyl methacrylate contains form 2 to 11 carbon atoms and at least 3 fluoride atoms, and (b) a ligand taken from the group consisting of (1) porphyrins, (2) Schiff bases, (3) cyclidenes, and (4) amine-like macrocycles, and (c) a transition metal (II) ion comprising cobalt, iron or manganese.

2. The membrane of claim 1 in which said ligand is a porphyrin.

3. The membrane of claim 2 in which said porphyrin is meso-tetrakis($\alpha,\alpha,\alpha,\alpha$-o-pivalamidophenyl)porphyrinato.

4. The membrane of claim 1 in which said transition metal (II) comprises cobalt (II).

5. The membrane of claim 1 in which said vinyl aromatic amine comprises vinyl imidazole or vinyl pyridine.

6. The membrane of claim 1 in which said transition metal (II) comprises from about 0.01 to 1.7 millimoles per gram of said complex.

7. The membrane of claim 1 in which (a) said vinyl aromatic amine comprises either vinyl imidazole or vinyl pyridine, (b) said ligand is meso-tetrakis (($\alpha,\alpha,\alpha,\alpha$-o-pivalamidophenyl) porphyrinato.

8. The membrane of claim 7 in which said cobalt (II) comprises from 0.01 to 0.20 millimoles per gram of said complex.

* * * * *